United States Patent
Kang

(10) Patent No.: US 7,420,548 B2
(45) Date of Patent: Sep. 2, 2008

(54) DISPLAY SYSTEM AND CONTROL METHOD THEREOF

(75) Inventor: Ho-Woong Kang, Youngin (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1311 days.

(21) Appl. No.: 10/032,328

(22) Filed: Dec. 31, 2001

(65) Prior Publication Data

US 2003/0038896 A1 Feb. 27, 2003

(30) Foreign Application Priority Data

Aug. 22, 2001 (KR) .............................. 2001-50706

(51) Int. Cl.
*G09G 5/00* (2006.01)

(52) U.S. Cl. .................. 345/204; 345/205; 345/211; 345/214

(58) Field of Classification Search ............ 345/204, 345/211, 214, 629, 1.1, 205, 531, 537; 710/28, 710/14, 22; 235/472.01, 492; 370/384, 395.1, 370/395.2, 395.6; 715/716; 348/E7.061, 348/E5.006
See application file for complete search history.

(56) References Cited

U.S. PATENT DOCUMENTS

| | | | | | |
|---|---|---|---|---|---|
| 3,653,001 | A | * | 3/1972 | Ninke | 345/690 |
| 4,251,759 | A | * | 2/1981 | Boldt | 318/490 |
| 4,414,537 | A | * | 11/1983 | Grimes | 341/20 |
| 5,703,795 | A | * | 12/1997 | Mankovitz | 715/721 |
| 5,774,375 | A | * | 6/1998 | Behrent | 702/106 |
| 5,880,702 | A | * | 3/1999 | Morimoto et al. | 345/1.1 |
| 6,121,962 | A | * | 9/2000 | Hwang | 345/211 |
| 6,144,848 | A | * | 11/2000 | Walsh et al. | 455/419 |
| 6,715,071 | B2 | * | 3/2004 | Ono et al. | 713/100 |
| 6,756,974 | B2 | * | 6/2004 | Nakajima et al. | 345/204 |
| 6,859,882 | B2 | * | 2/2005 | Fung | 713/300 |
| 7,242,988 | B1 | * | 7/2007 | Hoffberg et al. | 700/28 |
| 2001/0055029 | A1 | * | 12/2001 | Nakajima et al. | 345/629 |
| 2002/0059588 | A1 | * | 5/2002 | Huber et al. | 725/35 |
| 2003/0063052 | A1 | * | 4/2003 | Rebh | 345/76 |
| 2003/0066073 | A1 | * | 4/2003 | Rebh | 725/12 |
| 2004/0108992 | A1 | * | 6/2004 | Rosenberg | 345/156 |
| 2004/0172527 | A1 | * | 9/2004 | Ono et al. | 713/100 |
| 2007/0053513 | A1 | * | 3/2007 | Hoffberg | 380/201 |

FOREIGN PATENT DOCUMENTS

| | | |
|---|---|---|
| JP | 07-121283 | 5/1995 |
| JP | 11-265253 | 9/1999 |
| KR | 1997-25192 | 6/1997 |
| KR | 1998-35676 | 9/1998 |
| KR | 1999-23703 | 7/1999 |
| TW | 310408 | 4/2007 |

* cited by examiner

*Primary Examiner*—Prabodh Dharia
(74) *Attorney, Agent, or Firm*—Robert E. Bushnell, Esq.

(57) ABSTRACT

Disclosed is a display system displaying a picture on a screen by a video signal from a computer and serving as an input device of a computer coupled to the display system. The display system includes an input part through which a user inputs data, a signal processing part converting a signal inputted from the input part into a signal to be identified by the computer, a data interface between the computer and the display system, and a controlling part transmitting the signal inputted from the input part to the computer via the signal processing part and the data interface.

19 Claims, 5 Drawing Sheets

DISPLAY SYSTEM AND CONTROL METHOD THEREOF

This application makes reference to, incorporates the same herein, and claims all benefits accruing under 35 U.S.C. §119 from an application for DISPLAY SYSTEM AND CONTROL METHOD THEREOF earlier filed in the Korean Industrial Property Office on Aug. 22, 2001, and there duly assigned Serial No. 50706/2001 by that Office.

BACKGROUND OF THE INVENTION

1. Field of the Invention

The present invention relates in general to a display system and a control method thereof, and more particularly, to a display device, a computer coupled to the display device, and an input device coupled to the display device, the display device transmitting the input signal generated from the input device to the computer.

2. Description of the Related Art

Generally, a desktop computer system includes a computer, a display device, and an input device such as a keyboard, a mouse, etc. The display and input devices may be disposed adjacent to the user while the computer is disposed remote from the user. The display and input devices, however, should be directly connected to the computer because all hardware modules for the display device and the input device are mounted in the computer.

As described above, in the conventional desktop computer system, all of the computer, the display device, and the input device have to be disposed adjacent to each other. Thus, installation of the desktop computer system within a limited space is disadvantageous. Further, since various cables are needed for connecting the display and input devices to the computer, the circumstances of the desktop computer system becomes disordered and terribly messed up.

SUMMARY OF THE INVENTION

It is an object of the present invention to provide a display system able to serve as an input device of a computer system.

It is another object to provide an improved display system able to receive an external input signal as input signals for one of the display system and an external computer coupled to the display system.

It is still another object to provide a display system able to convert an external input signal is inputted from an external input device coupled to the display system into a specific signal for an external computer coupled to the display system.

It is yet another object to provide a display system able to shut down a computer coupled to the display system when the display system receives a specific code signal from an input device coupled to the display system.

It is still yet another object to provide a display system able to activate a computer coupled to the display system in accordance with a control signal input from an input device coupled to the display system.

It is also an object to provide a display system including an input terminal formed on the display system and coupled to an external input device, an input and output terminal formed on the display system and coupled to an external computer, and a controller coupled to both the input terminal and the input and output terminal to control a data path formed between the input terminal and the input and output terminal These and other objects of the present invention may be accomplished by the provision of a display system displaying a picture on a screen in response to a video signal received from a computer and having a computer input mode and a display system input mode. The display system includes an input part through which a user inputs an input signal, a signal processing part converting the input signal inputted from the input part into an output signal to be recognized by the computer, a data interface between the computer and the display system, and a controlling part transmitting the output signal to the computer via the signal processing part and the data interface in the computer input mode.

The display system includes a memory storing a control signal controlling the computer. The controlling part controls the signal processing part to convert the input signal inputted from the input part into the control signal, to store the control signal in the memory, and to transmit the control signal from the memory to the computer depending on a predetermined condition via the data interface.

Preferably, the display system further includes OSD generating part generating an OSD for setting up a displaying condition. The controlling part controls the OSD generating part to generate the OSD in accordance with the input signal inputted from the input part in the display system input mode.

Preferably, the display system further includes an input mode selecting part for selecting one of the computer input mode and the display system input mode respectively receiving the input signal inputted from the input part as a specific signal for the computer or the display system. The controlling part transmits the input signal inputted from the input part to the computer via the signal processing part and the data interface in the case of the computer input mode, and controls the ax display system according to the input signal inputted from the input part in the case of the display system input mode. Herein, the input part is at least one of a mouse and a keyboard.

A method in the display system includes the steps of connecting an input part to the display system, selecting one of the computer input mode and the display system input mode respectively receiving an input signal inputted from the input part as a specific signal for the computer and the display system, converting the input signal inputted from the input part into an output signal to be recognized by the computer in the computer input mode and transmitting the converted signal to the computer. Preferably, the method further includes the step of setting up the display system in response to the input signal inputted from the input part in the display system input mode.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
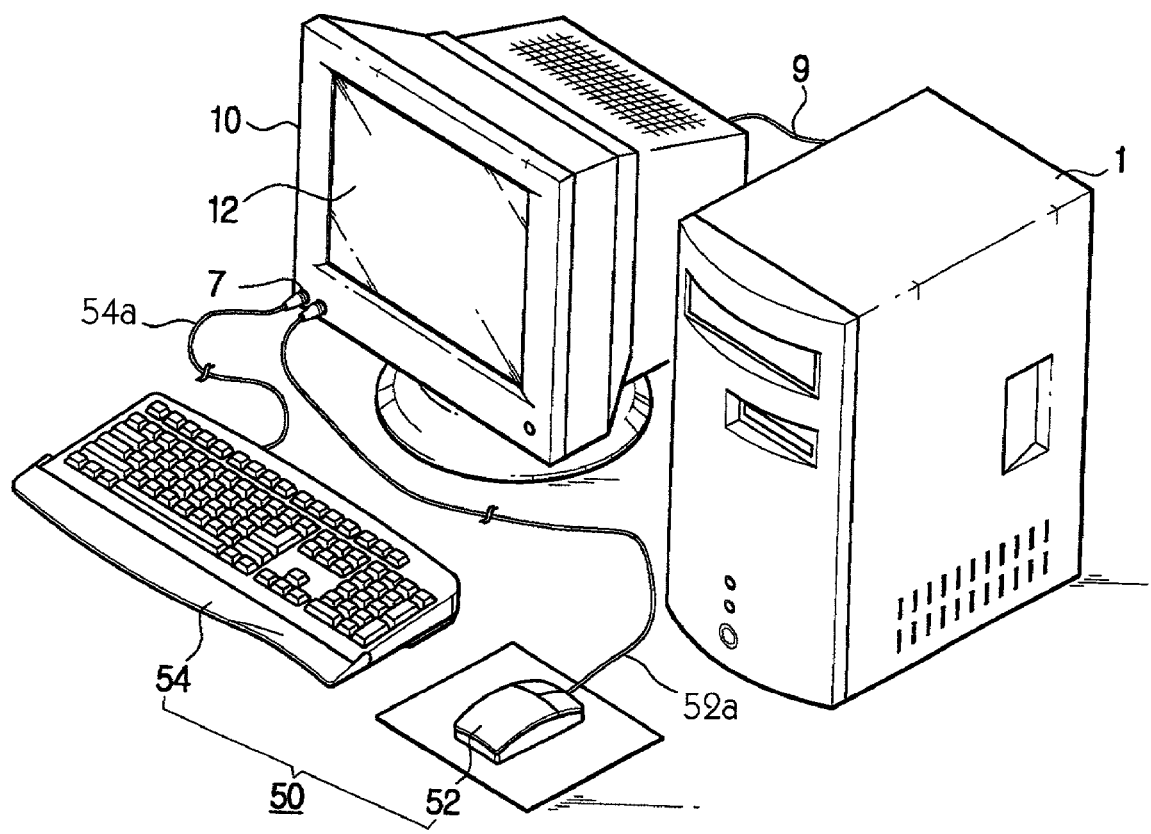
FIG. 1 is a perspective view of a computer system having a display system according to the present invention.

Turning now to the drawings, FIG. 1 shows a display device 10 provided with input ports 7 having input connectors 52a and 54a through which input devices 50, such as a keyboard 54 and a mouse 52, are connected to display device 10. At the rear of display device 10 is provided a terminal of which display device 10 is connected to a computer 1 through a predetermined cable 9, so that display device 10 and computer 1 can communicate with each other through cable 9. Accordingly, it is desirable that cable 9 employs a Display Data Channel (DDC) or Universal Serial Bus (USB) standard adapted for use in a mutual communication.

If a user inputs an input signal through mouse 52 or keyboard 54 which are connected to display device 10, the input signal from mouse 52 or keyboard 54 is transmitted to computer 1 through cable 9, while a video signal from computer 1 is transmitted to display device 10 through cable 9, thereby displaying a picture on a screen 12.

Figure 2:
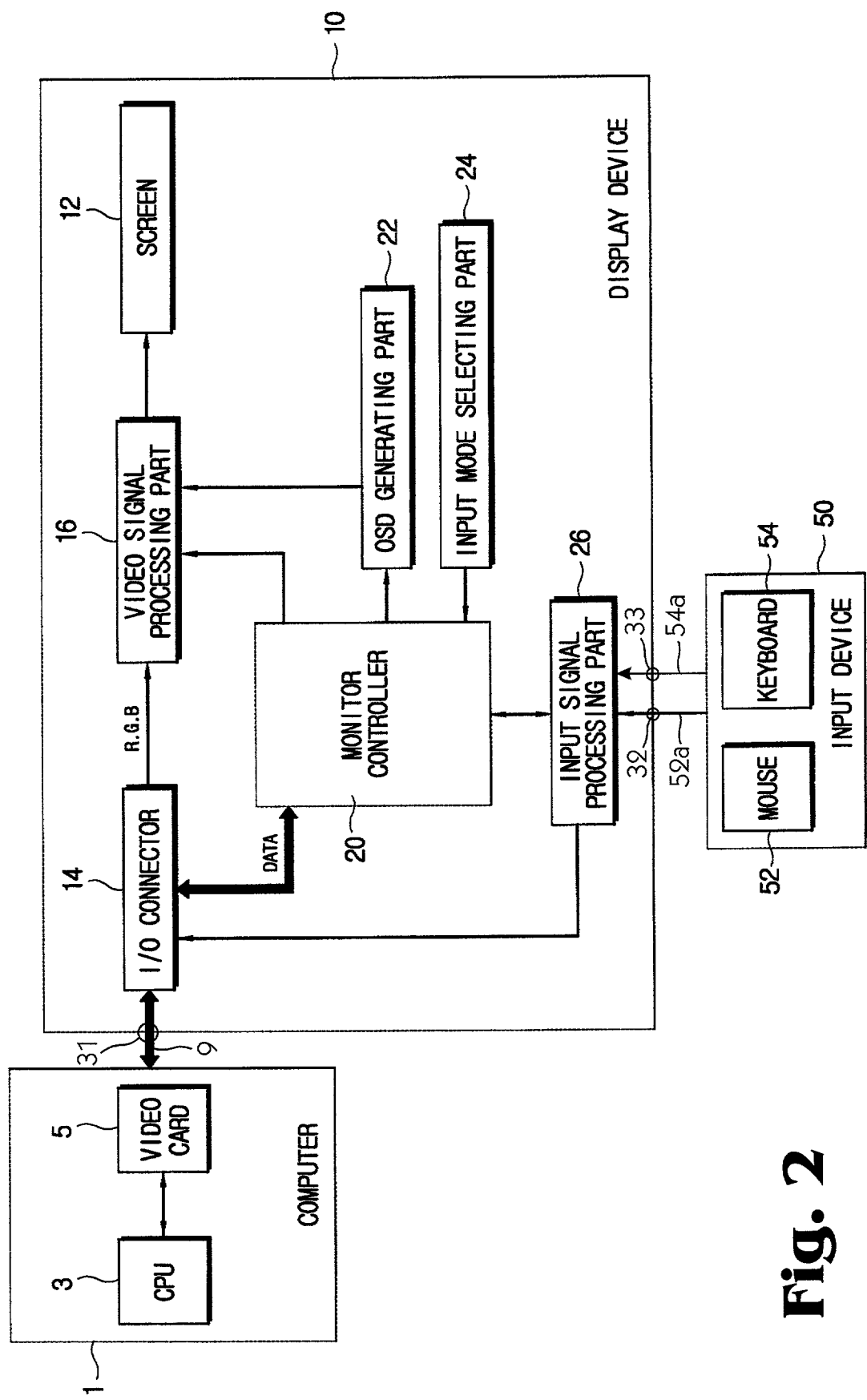
FIG. 2 is a control block diagram of the computer system of FIG. 1.

As shown in FIG. 2, computer 1 includes a central processing unit (CPU) 3 controlling the operation of computer 1 and a video card 5. Video card 5 generates the video signal having Red, Green, Blue (RGB) signals and horizontal/vertical synchronous signals to display device 10 for displaying the picture in response to a control of CPU 3, and transmits a signal inputted from display device 10 to CPU 3 through cable 9.

Input connectors 52a and 54a of mouse 52 and keyboard 54 are coupled to input terminals and 33 formed on display device 10, respectively. One end of cable 9 is coupled to an input and output terminal 31 formed on display device 10 while the other end of cable 9 is coupled to a power consuming appliance such as computer 1.

Display device 10 includes an I/O connector 14 employed as a data interface between computer 1 and display device 10, a video signal processing part 16 for processing the video signal inputted from computer 1 through I/O connector 14 to be displayed, a screen 12 displaying the And processed video signal thereon, an On Screen Display (OSD) generating part 22 generating an OSD, and a monitor controller 20 controlling functions of display device 10.

Further, display device 10 includes an input mode selecting part 24 through which a user can select an input mode, and an input signal processing part 26 processing an input signal inputted from input device 50. Monitor controller 20 controls input signal processing part 26 according to the input mode selected by the user through input mode selecting part 24.

Through input mode selecting part 24, a user can select the input mode of whether input device 50 connected to display device 10 operates in a computer input mode for inputting the input signal to computer 1 or operates in a display system input mode for controlling the operations of display device 10. Thus, it is desirable that input mode selecting part 24 includes a predetermined selecting button provided in the outside of display device 10. Alternatively, it is possible that the input mode is selected with a hot key of keyboard 54 or OSD of screen 12.

I/O connector 14 is the data interface for data communication between computer 1 and display device 10. Thus, the video signal generated from video card 5 of computer 1 is transmitted to display device 10 through I/O connector 14, while the input signal from input signal processing part 26 and the data and control signals generated from monitor controller 20 are transmitted to computer 1.

Input signal processing part 26 transmits the input signal inputted through input device 50 such as mouse 52 and keyboard 54 which are connected to display device 10 to monitor controller or to computer 1 through I/O connector 14.

In the case that a user selects the computer input mode, if the input signal is inputted from input device 50, input signal processing part 26 transmits the input signal to computer 1 in accordance with the control of monitor controller 20 via I/O connector 14. The input signal is fed is from input signal processing part 26 to I/O connector 14 directly or to I/O connector 14 via monitor controller 20. That is, if input signal processing part 26 receives the input signal inputted from input device 50, input signal processing part 26 generates an interrupt signal to CPU 3 of computer 1 and then transmits the input signal inputted from keyboard 54 and mouse 52 to computer 1 via I/O connector 14. Then, CPU 3 of computer 1 analyzes the input signal inputted via I/O connector 14 by executing an input signal processing routine, thereby performing a control corresponding to the analysis. Consequently, CPU 3 identifies the input signal as a first input device signal inputted from input device 50 as if input device 50 is directly connected to computer 1.

On the other hand, in the case that the user selects the display device input mode, the input signal inputted from input device 50 is transmitted to monitor controller 20 via input signal processing part 26. Then, monitor controller 20 executes a predetermined input signal processing routine and identifies the input signal inputted from the input device 50 as a second input device signal for controlling display device 10.

For example, if a position displacement signal is transmitted from mouse 52 to monitor controller 20, monitor controller 20 computes a mouse cursor position corresponding to the position displacement signal, to thereby control the mouse cursor position. That is, monitor controller 20 of display device 10 according to the present invention converts the input signal inputted from keyboard 54 or mouse 52 to the second input device signal, and thus controls OSD generating part 22, video signal processing part 16, etc. Therefore, the user can adjust a display of display device and control the OSD by using mouse 52 or keyboard 54.

Figure 3:
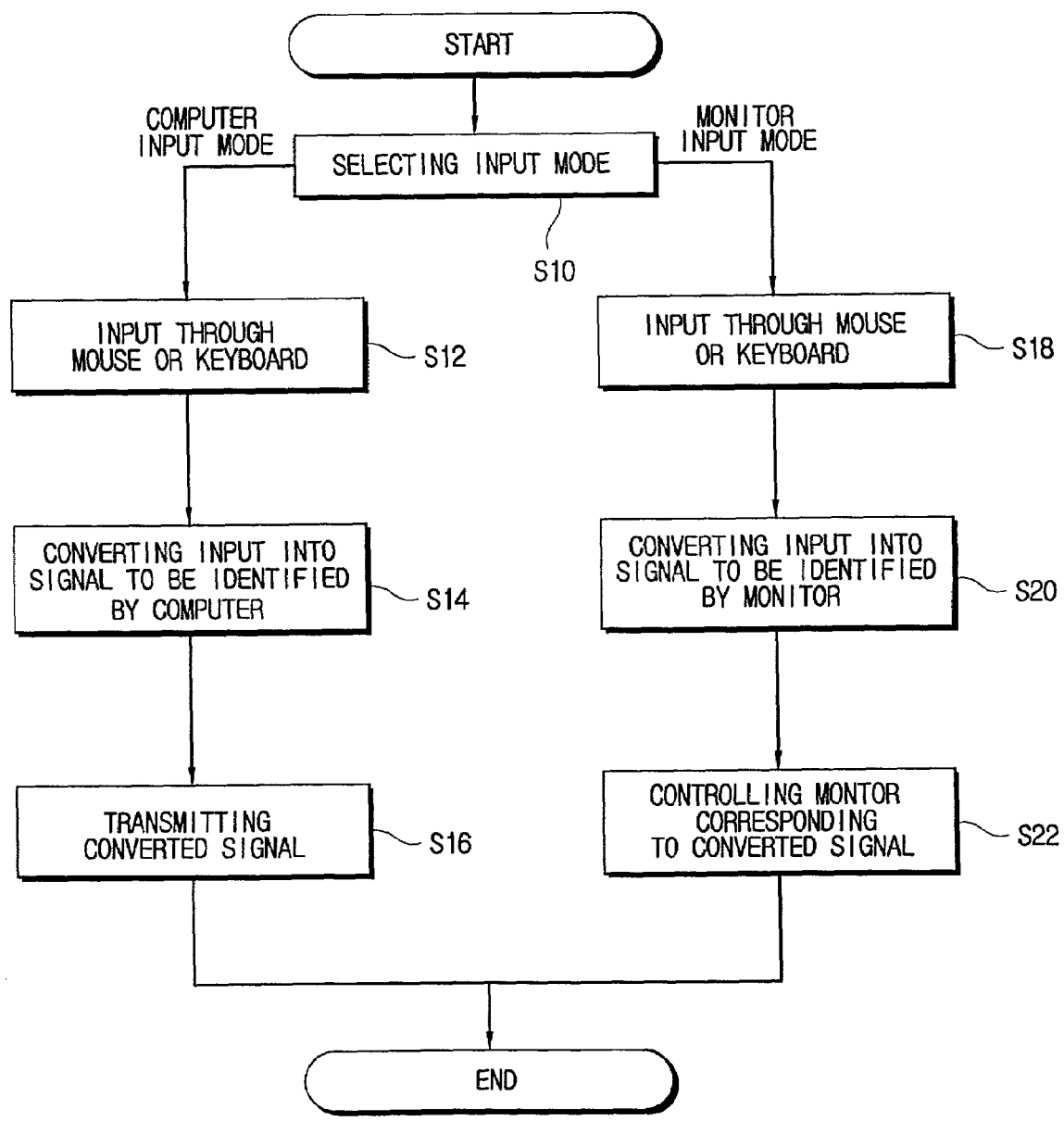
FIG. 3 is a control flow chart of the display system according to the present invention.

With this configuration, as shown in FIG. 3, a method of controlling display device 10 will be described hereinafter. A user selects one of the computer input mode and the display device input mode through input mode selecting part 24 in step S10. In the case that a user selects the computer input mode, if the input signal is inputted from mouse 52 or keyboard 54 in step S12, the input signal inputted from input device 50 is converted into the output signal as the first input device signal to be recognized by computer 1 in response to a control signal of monitor controller 20 in step S14, and then transmitted to computer 1 in step S16. The input signal may be transmitted to computer 1 without being converted into the output signal or the first input device signal. On the other hand, in the case that a user selects the display device input mode, if the input signal is inputted from mouse 52 or keyboard 54 in step S18, monitor controller 20 converts the input signal into the second input device signal for controlling display device 10 in step S20, and then controls display device corresponding to the converted control signal in step S22. The input signal may be used for controlling display device 10 without being converted into the second input device signal.

Figure 4:
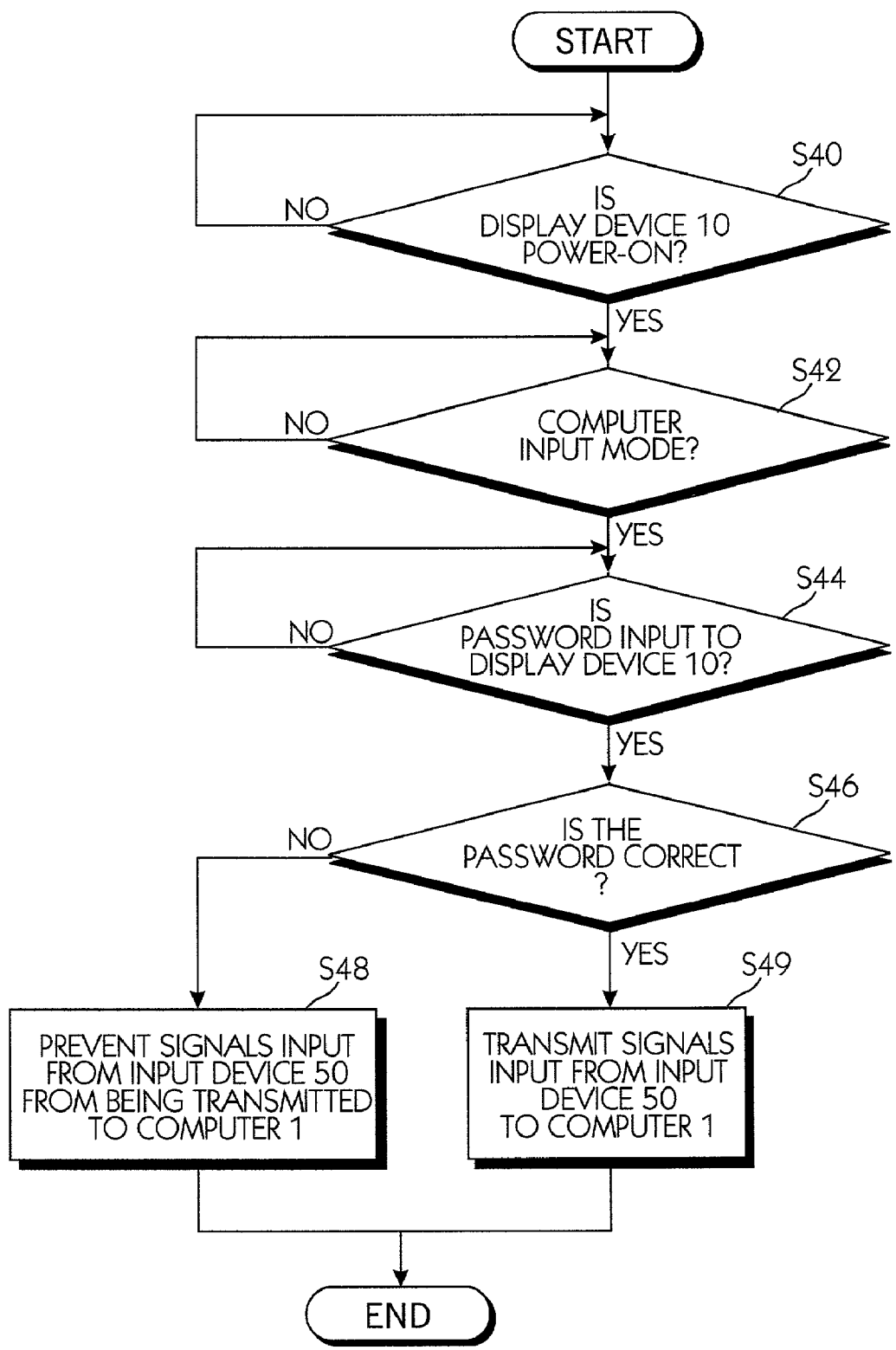
FIG. 4 is a flow chart showing a second embodiment of the display system.

In FIG. 4, display device 10 can control the input signal to be transmitted to computer 1 after processing the input signal inputted from input device 50 separately from computer 1. For example, when display device 10 is power-on in step S40, monitor controller 20 can require a user to input a password to OSD generating part 22 in the computer input mode in step S42 and in step S44. Then, monitor controller 20 determines whether or not the password inputted from input device 50 is correct or identical to a reference stored in a memory of monitor controller 20 in step S46. If the password is not correct, monitor controller 20 controls input signal processing part 26 to prevent the input signal inputted from input device 50 from being transmitted to computer 1 or from being converted into the output signal as the second input device signal in step S48. If the password is correct, monitor controller 20 generates an activation signal as the output signal or the second input device signal to computer 1 to activate computer 1 in step S49.

Figure 5:
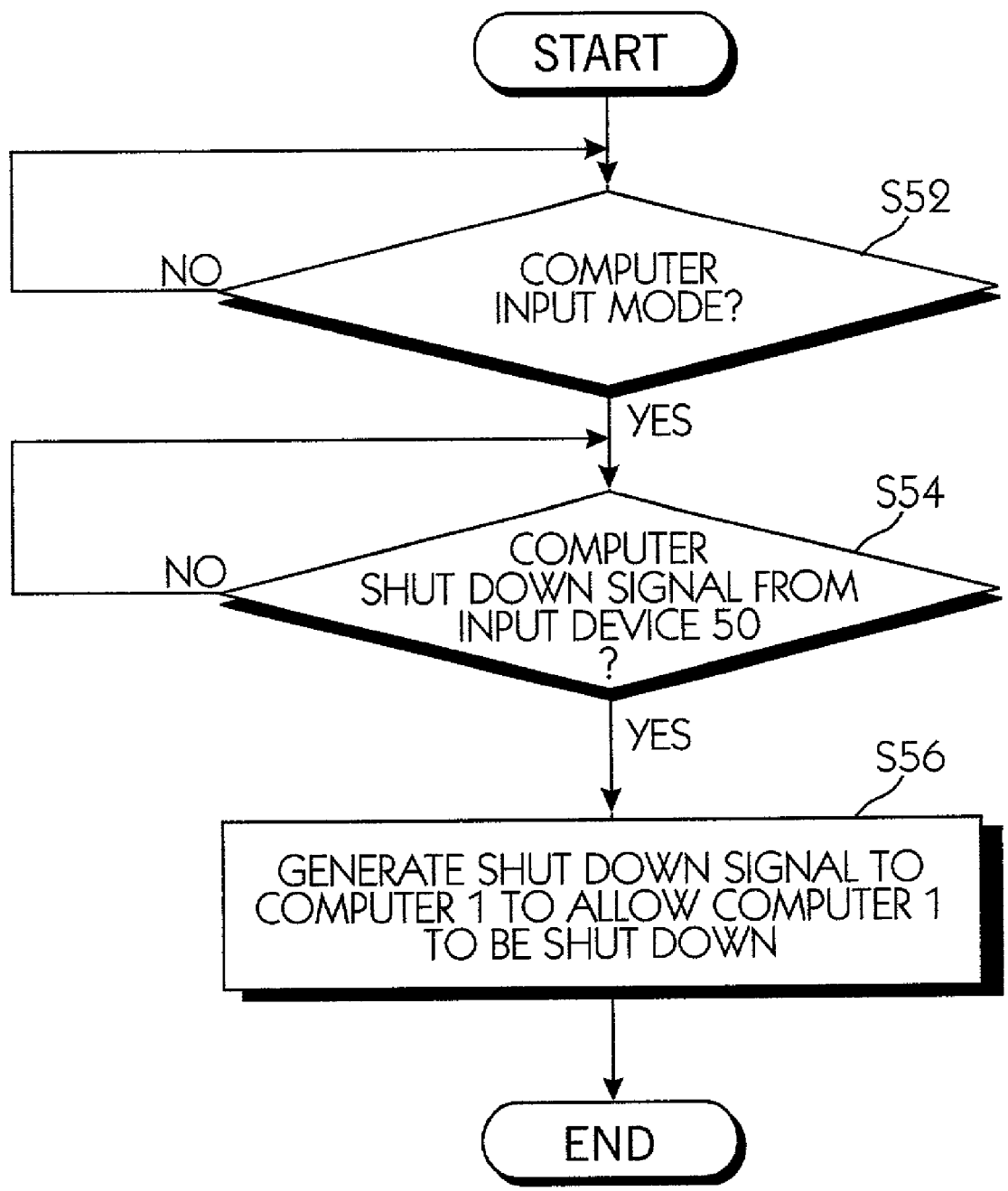
FIG. 5 is a flow chart showing a third embodiment of the display system.

In FIG. 5, monitor controller 20 of display device 10 can control computer 1 by using the input signal transmitted toward computer 1. For example, if a user selects a system shut down function at the computer input mode in step S52, monitor controller 20 receives a shut down signal through input signal processing part 26 in step S54 and turns off computer 1 together with display device 10 by transmitting a shut down control signal to computer 1 in step S56.

Monitor controller 20 may shut down computer 1 by generating the shut down control signal when the shut down signal inputted from keyboard 54 or mouse 52 is received in the display device input mode 20.

As described above, according to the display system of the present invention, an input signal inputted from a keyboard and a mouse is transmitted to a computer via a display device. Thus, the input signal inputted through the input device can be employed as either a first predetermined signal being inputted to the computer or a second predetermined signal for controlling the display device, and the display device can be used as an input device by allowing the display device to transmit a control signal to the computer in response to the input signal.

As described above, the present invention provides a display system which can serve as an input device of the computer.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A display system receiving a video signal from a computer and displaying a picture on a screen corresponding to the video signal, comprising:
   an input terminal;
   a signal processor converting an input signal applied to the input terminal into an output signal to be recognized by the computer;
   a data interface coupled to the signal processor and connected between the computer and the display system; and
   a controller transmitting the output signal to the computer via the signal processor and the data interface and generating an activation control signal to the input terminal and an output terminal when the input signal represents an activation signal to initiate an increase in consumption of energy by an external apparatus coupled to the input and output terminal.

2. The display system of claim 1, further comprising:
   a memory; and
   the controller regulates the signal processor to convert the input signal into a control signal controlling the computer, stores the control signal in the memory, and transmits the control signal from the memory to the computer via the data interface.

3. The display system of claim 1, further comprising an on-screen display generator providing a variable video display for setting up a displaying condition, wherein the controller controls the on-screen display generator to generate the video display in response to the input signal.

4. The display system of claim 1, further comprising:
   an input mode selector providing one of a computer input mode and a display system input mode for respectively recognizing the input signal as an output signal to be applied to the computer and as a control signal for controlling the display system; and the controller transmits the input signal to the computer via the signal processor and the data interface in the computer input mode, and the controller controls the display system in response to the input signal in the display system input mode.

5. The display system of claim 1, further comprised of the input terminal coupled to at least one of a mouse and a keyboard.

6. A display device, comprising:
   a controller;
   an input terminal coupled to the controller disposed to receive an input signal;
   an input and output terminal coupled to the controller disposed to receive a video signal and transmit an output signal;
   an input mode selector coupled to the controller selectively providing a computer input mode and a display device input mode;
   the controller transmitting the output signal in response to reception of the input signal during the computer input mode; and
   the controller controlling the video signal in response to reception of the input signal during the display device input mode and generating an activation control signal to the input and output terminal when the input signal represents an activation signal to initiate an increase in consumption of energy by an external apparatus coupled to the input and output terminal.

7. The display device of claim 6, further comprise of the controller converting the input signal into the output signal in accordance with the computer input mode.

8. The display device of claim 6, further comprising:
   a video display device; and
   a computer coupled to the input and output terminal, wherein the computer transmits the video signal to the video display device and receives the output signal from the video display device.

9. The display device of claim 6, further comprising an input device disposed outside the display device, coupled to the input terminal, and providing the input signal to the display device.

10. The display device of claim 9, wherein the input device comprises one of a mouse and a keyboard.

11. The display device of claim 6, further comprise of the input mode selector disposed outside the display device and coupled to the input terminal.

12. The display device of claim 11, wherein the input device comprises one of a mouse and a keyboard.

13. The display device of claim 6, further comprised of the controller responding to reception of the input signal by generating a shut down signal for consumption of power by an external apparatus coupled to the input and output terminal.

14. The display device of claim 6, further comprised of the controller generating a shut down control signal to the input and output terminal when the input signal is a shut down signal for shutting down to reduce consumption of power by an external apparatus coupled to the input and output terminal.

15. The display device of claim 6, further comprised of the controller responding to reception of the input signal representing a password signal by activating an external apparatus coupled to the input and output terminal.

16. Controlling a display device, with the steps comprised of:
receiving an input signal from a mouse or a keyboard at an input terminal of the display device;
receiving a video signal and transmitting an output signal via an input and output (I/O) connector disposed within the display device;
alternatively selecting one of a first mode and a second mode;
converting the input signal into a converted signal to be identified by a computer when the first mode is selected;
transmitting the converted signal via the I/O connector to the computer for analysis;
controlling a display of the display device in response to the input signal when the second mode is selected;
making a determination of whether the input signal is a shut-down signal or an activation signal for activating an external apparatus coupled to the I/O connector; and
applying a control signal to the I/O connector to regulate energy consumption by an appliance coupled to the I/O connector in dependence upon the determination.

17. The method of claim 16, the converting step comprising a step of:
converting the input signal into an output signal functionally controlling the computer coupled to the I/O connector when the first mode is selected.

18. Controlling a display device, with the steps comprised of:
receiving an input signal from a mouse or a keyboard at an input terminal of the display device;
receiving a video signal and transmitting an output signal via an input and output (I/O) connector disposed within the display device; alternatively selecting one of a first mode and a second mode; converting the input signal into a converted signal to be identified by a computer when the first mode is selected;
transmitting the converted signal via the I/O connector to the computer for analysis;
controlling a display of the display device in response to the input signal when the second mode is selected;
making a determination whether the input signal is identical to a reference; and
generating to the I/O connector an activation control signal for activating an external apparatus coupled to the I/O connector in accordance with the determination.

19. Controlling a display device, with the steps comprised of:
receiving an input signal from a mouse or a keyboard at an input terminal of the display device;
receiving a video signal and transmitting an output signal via an input and output (I/O) connector disposed within the display device;
alternatively selecting one of a first mode and a second mode;
converting the input signal into a converted signal to be identified by a computer when the first mode is selected;
transmitting the converted signal via the I/O connector to the computer for analysis;
controlling a display of the display device in response to the input signal when the second mode is selected;
making a determination whether input signal is not identical to a reference; and
preventing the input signal from being transmitted to the I/O connector in accordance with the determination.

* * * * *